E. GARCEAU.
CLUTCH OPERATING MEANS.
APPLICATION FILED SEPT. 27, 1909.
985,795.
Patented Mar. 7, 1911.
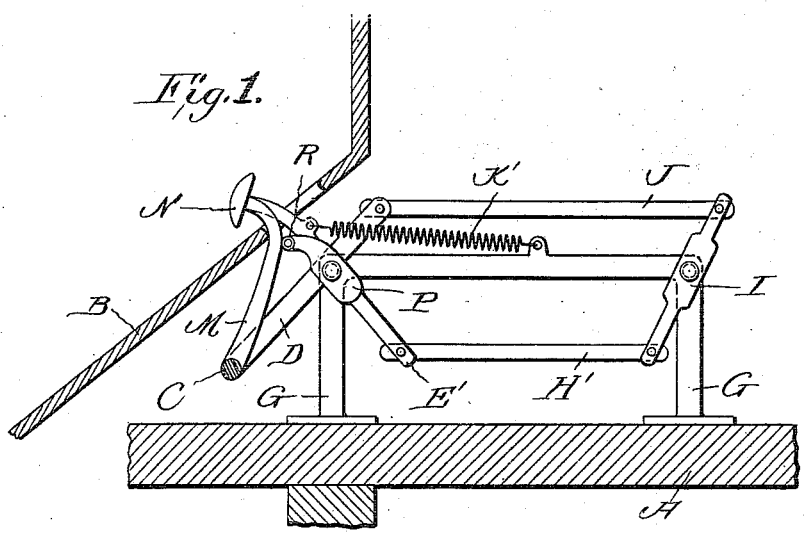
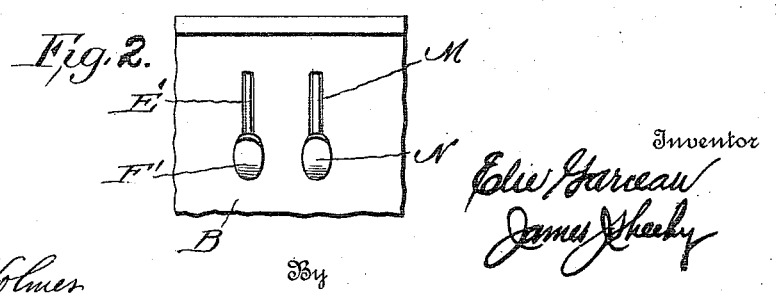

UNITED STATES PATENT OFFICE.

ELIE GARCEAU, OF WOONSOCKET, RHODE ISLAND, ASSIGNOR OF ONE-HALF TO CHARLES A. PROULX, OF WOONSOCKET, RHODE ISLAND.

CLUTCH-OPERATING MEANS.

985,795.  Specification of Letters Patent.   Patented Mar. 7, 1911.

Application filed September 27, 1909. Serial No. 519,866.

*To all whom it may concern:*

Be it known that I, ELIE GARCEAU, a citizen of the United States, residing at Woonsocket, in the county of Providence and State of Rhode Island, have invented new and useful Improvements in Clutch-Operating Means, of which the following is a specification.

My invention has to do with the operation of clutches on automobiles, and one of the objects of the invention is the provision of simple and reliable means for affording a gain of power intermediate the clutch operating lever and the clutch working shaft, so that the clutch may be released with the expenditure of but little effort; the said means being so constructed and arranged as to assure the release of the clutch when the brake pedal is operated, and yet permit of the clutch being released without operation of the brake when occasion demands the latter operation.

My invention will be best understood by reference to the following description when taken in connection with the accompanying illustration of one specific embodiment thereof, while the scope will be more particularly pointed out in the appended claims.

In the drawings: Figure 1 is a view, partly in elevation and partly in section, of the construction constituting the best practical embodiment of my invention that I have as yet devised. Fig. 2 is a detail plan view showing the relative arrangement of the brake pedal and the pedal of the clutch operating lever above the foot rest of an automobile.

Referring by letter to the said drawings, A is a portion of an automobile frame.

B is the foot rest of the automobile, and C is a suitably supported rock-shaft having a crank arm D, and arranged as shown relative to the frame A and the foot rest B. The said shaft C is designed to be connected in conventional or any other suitable manner with the clutch mechanism of an automobile, but inasmuch as the clutch mechanism and the connection between the shaft C and the same forms no part of my invention, I have deemd it unnecessary to illustrate the clutch mechanism and the connection referred to.

E' is the clutch operating lever of my improvements which extends and is adapted to work through the foot rest B, and is provided above the said foot rest with a pedal F'. The lever E' is fulcrumed on a suitable fixed support G, and its lower and comparatively short or weight arm is connected through a rod H' with the comparatively long or power arm of a lever I, also fulcrumed on the support G. The upper comparatively short and weight arm of the lever I is connected through a rod J with the before-mentioned crank D of the rock-shaft C, and consequently it will be manifest that when the lever E' is actuated to release the clutch, a gain of power is afforded between the said lever E' and the shaft C, with the result that but little effort is required for said operation, notwithstanding the stiffness of the springs and various parts ordinarily required to hold the clutch in position.

With a view of overcoming or taking up looseness in the connections of the various elements comprised in the power-gaining connection described, I provide the tractile spring K' interposed between and connected to the support G and the upper arm of the lever E'. From this it follows that when the upper arm of the lever E' is moved forwardly, a gain of power will be afforded between the said lever and the crank D of the clutch working shaft C, and consequently the shaft C may be actuated to release the clutch when but little pressure is exerted against the pedal F'.

M is a brake lever loosely mounted or fulcrumed on the rock-shaft C and extending loosely through the foot rest B.

N is the brake pedal on said lever M, and P in Fig. 1 is an auxiliary element designed to be engaged and moved by the brake lever M when the latter is moved forwardly. The said auxiliary element P is preferably provided with an anti-friction roller R opposed to the forward edge of the lever M; and it is preferably (though not necessarily), fixed with respect to the lever E', and has the same fulcrum as said lever E'.

By virtue of the provision of the auxiliary element P, arranged in the path of the lever M and connected with the rod H' and movable by said lever M and also independently of the same it will be manifest that the lever E' may be operated to release the clutch without entailing movement of the brake lever M, and without application of the brake, the auxiliary element P in that case moving idly in front of the brake lever M. When, however, the brake lever M is pressed forwardly to apply the brakes, it will be seen that said lever, by acting against the roller R on the auxiliary element P will, through the medium of the connection described, rock the shaft C to release the clutch. Thus with one foot the automobile driver is enabled to apply the brake and release the clutch in one operation.

While I have shown and described one form of my invention, it is to be understood that I am not limited to the details or the form or relative arrangement of parts disclosed, but that limited modifications may be made therein, without departing from the spirit of the invention. For instance, in lieu of applying the power gaining means to a clutch operating lever, it may be applied to a lever for working a brake or any other device to be worked.

Having described my invention, what I claim and desire to secure by Letters-Patent, is:

1. In means for the purpose described, the combination of a frame, an apertured foot-rest disposed above the same, a support mounted on the frame and in front of the foot-rest, an element to be moved located below the foot-rest, a forward lever fulcrumed at an intermediate point of its length on the support and having its weight arm connected with the element to be moved, a rear lever fulcrumed at an intermediate point of its length on the support and having an upper arm extending through and movable in the foot-rest and provided above said rest with a pedal, a rod extending between and connecting the lower and weight arm of said lever with the lower and power arm of the first-named lever, and a third lever extending through and movable in the foot-rest and provided above the foot-rest with a pedal; the said third lever being arranged alongside the second-named lever and one of the two last mentioned levers being provided below the foot-rest with means for coöperating with the other, whereby one lever is movable forward by the other and is also movable forward independently of such other.

2. In means for the purpose described, the combination of a frame, an apertured foot-rest disposed above the same, a support mounted on the frame and in front of the foot-rest, an element to be moved located below the foot-rest, a forward lever fulcrumed at an intermediate point of its length on the support and having its weight arm connected with the element to be moved, a rear lever fulcrumed at an intermediate point of its length on the support and having an upper arm extending through and movable in the foot-rest and provided above said rest with a pedal, a tractile spring extending between and connected to the support and the upper arm of said lever, a rod extending between and connecting the lower and weight arm of said lever with the lower and power arm of the first-named lever, and a third lever extending through and movable in the foot-rest and provided above the foot-rest with a pedal; the said third lever being arranged alongside the second-named lever and one of the two last mentioned levers being provided below the foot-rest with means for coöperating with the other, whereby one lever is movable forward by the other and is also movable forward independently of such other.

In testimony whereof I have hereunto set my hand in presence of two subscribing witnesses.

ELIE GARCEAU.

Witnesses:
CHARLES F. BUCKLEY,
EDGAR L. SPAULDING.

---

Copies of this patent may be obtained for five cents each, by addressing the "Commissioner of Patents, Washington, D. C."